Dec. 13, 1955  R. B. BLACK  2,726,646
GASEOUS FLUID OPERATED PRIME MOVER
WITH ROTARY SLEEVE VALVE ASSEMBLY
Filed Feb. 7, 1952  4 Sheets-Sheet 3

INVENTOR
Robert B. Black
BY Roy A. Plant
ATTORNEY

Dec. 13, 1955

R. B. BLACK 2,726,646

GASEOUS FLUID OPERATED PRIME MOVER
WITH ROTARY SLEEVE VALVE ASSEMBLY

Filed Feb. 7, 1952

INVENTOR
Robert B. Black
BY Roy A. Plant
ATTORNEY

United States Patent Office 2,726,646
Patented Dec. 13, 1955

2,726,646

GASEOUS FLUID OPERATED PRIME MOVER WITH ROTARY SLEEVE VALVE ASSEMBLY

Robert B. Black, Corpus Christi, Tex.

Application February 7, 1952, Serial No. 270,350

17 Claims. (Cl. 123—65)

The present invention relates broadly to power producing equipment, and in its specific phases to a rotary sleeve valve mechanism for use in prime movers of the expansible fluid operated type.

While in the internal combustion engine field there has been an extreme amount of development leading to higher compression ratios, better fuels, and balancing for vibration, et cetera, the valves for such engines, aside from the early endwise reciprocating sleeve valves, such as were used in the Knight engine, have been practically universally of the poppet type. In the meantime steam driven prime movers of the reciprocating piston type have not kept pace with the development in efficiency of internal combustion type engines. Valves for steam engines have been limited substantially to slide valves, Corliss type valves, piston valves, and poppet valves. A slight amount of development work has been done in the sleeve valve field and this, in general, has involved either endwise reciprocating sleeve valves, or highly complex sleeve valve constructions which lead to lubrication problems, and eccentric loading, as well as various of the old steam engine difficulties commonly referred to as wire drawing, condensation and reevaporation, recompression et cetera. It was a knowledge of these problems and shortcomings of the prior constructions, and a recognition of the need of an improved rotary sleeve valve type of construction which lead to the conception and development of the present invention.

Accordingly among the objects of the present invention is the provision of a rotary sleeve valve construction suitable for substantially meeting the ideal requirements demanded for short cut-off while providing adequate exhaust relief even under high speed operation.

Another object is to provide a rotary sleeve valve assembly which permits high rotative engine speeds without inertia forces creating undue or excessive internal strains in the valve mechanism.

Another object is to provide a rotary sleeve valve mechanism which at all times permits sudden admission and sudden stopping of flow of gaseous fluid under high pressure to the engine cylinders through adequate port areas.

Another object is to provide a rotary sleeve valve mechanism which makes possible the controlled admission to the cylinder or cylinders of an engine of a gaseous fluid, under pressure, from one extreme of the shortest possible cut-off which will meet a given engine load, thus achieving maximum expansion and efficiency, to the opposite extreme of full gaseous fluid admittance almost to the end of the expansion stroke for maximum power.

Another object is to provide a rotary sleeve valve including prime mover, operated by a gaseous fluid under pressure, wherein said prime mover is both self-starting and reversible.

Another object is to provide a rotary sleeve valve including prime mover which is directly connectable for driving purposes without the need of a transmission or clutch.

Another object is to provide a rotary sleeve valve mechanism which is well adapted for use with uniflow engines, the construction of which places a maximum distance between the hot inlet port and the relatively cool exhaust port.

Another object is to provide a rotary sleeve valve mechanism having no continuously reciprocating parts and no problems coming out of inertia forces, and hence its rotative speed is limited only to the speed of the other parts of the prime mover of which it forms a part.

Another object is to provide a rotary sleeve valve mechanism whose inherent performance characteristics and efficiency are practically constant throughout its whole rotative speed range.

A further object is to provide a rotary sleeve valve mechanism which is free from vibration and noise due to the avoidance of reciprocating parts, and also due to its substantially perfect balance and inherent simplicity, all of which are conducive to freedom from factors which promote wear.

A further object is to provide a rotary sleeve valve mechanism capable of operation with a piston type prime mover actuated either by internal combustion or by steam under relatively high pressures and temperatures.

A further object is to provide a rotary sleeve valve mechanism adapted for practical lubrication even when handling either saturated or superheated steam at high temperatures.

A further object is to provide a uniflow steam engine having a rotary sleeve valve mechanism, wherein the piston clearance at the top of its stroke can be held to a minimum when operating condensing under low vacuum.

A further object is to provide a rotary sleeve valve mechanism particularly adapted for use with uniflow steam engines, and wherein means are provided for exhausting residual steam left in the engine cylinder or cylinders after the exhaust port is closed and wherein the engine is either operating non-condensing, or condensing substantially under atmospheric conditions.

A further object is to provide a rotary sleeve valve mechanism which is of low initial cost due to its extreme simplicity, and of low maintenance cost due to using only one continuously moving part for a bank of cylinders.

A further object is to provide a rotary sleeve valve mechanism which includes a cut-off sleeve for varying the proportionate time during which the operating gaseous fluid can pass into the cylinder or cylinders of the prime mover, said cut-off sleeve also being movable endwise to accomplish throttling of the flow of gaseous fluid into said cylinder or cylinders.

A further object is to provide means for actuating the cut-off sleeve of the rotary sleeve valve mechanism so as to either rotate it to vary the cut-off and direction of prime mover rotation, or to move it endwise to accomplish throttling.

A further object is to provide a rotary sleeve valve mechanism which utilizes labyrinths to relieve eccentric loading of the rotary valve sleeve and thus avoid excessive friction loads under use of high pressure steam or other gaseous fluid.

A further object is to provide means in connection with a rotary sleeve valve mechanism of a uniflow steam engine for controlling the degree of recompression of residual steam in the cylinder or cylinders by imparting a predetermined resistance to the exhaust of same.

A further object is to provide a rotary sleeve valve mechanism which is adaptable for useful application to a wide variety of engines varying from single-cylinder or multi-cylinder, single-acting or double-acting, uniflow or counterflow types of steam engines to single-cylinder or multi-cylinder constant pressure or constant volume types of internal combustion engines. However, its most ideal application is in connection with multi-cylinder single-acting uniflow types of engines.

Still further objects and advantages of the invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but several of various ways in which the principle of the invention may be used.

In the annexed drawings—

Figure 1:
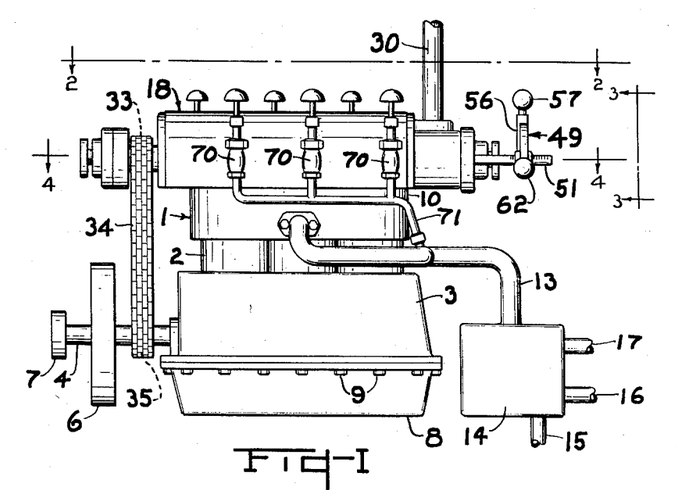
Figure 1 shows in diagrammatic manner a side view of a three cylinder uniflow engine embodying the present invention.
Figure 14:
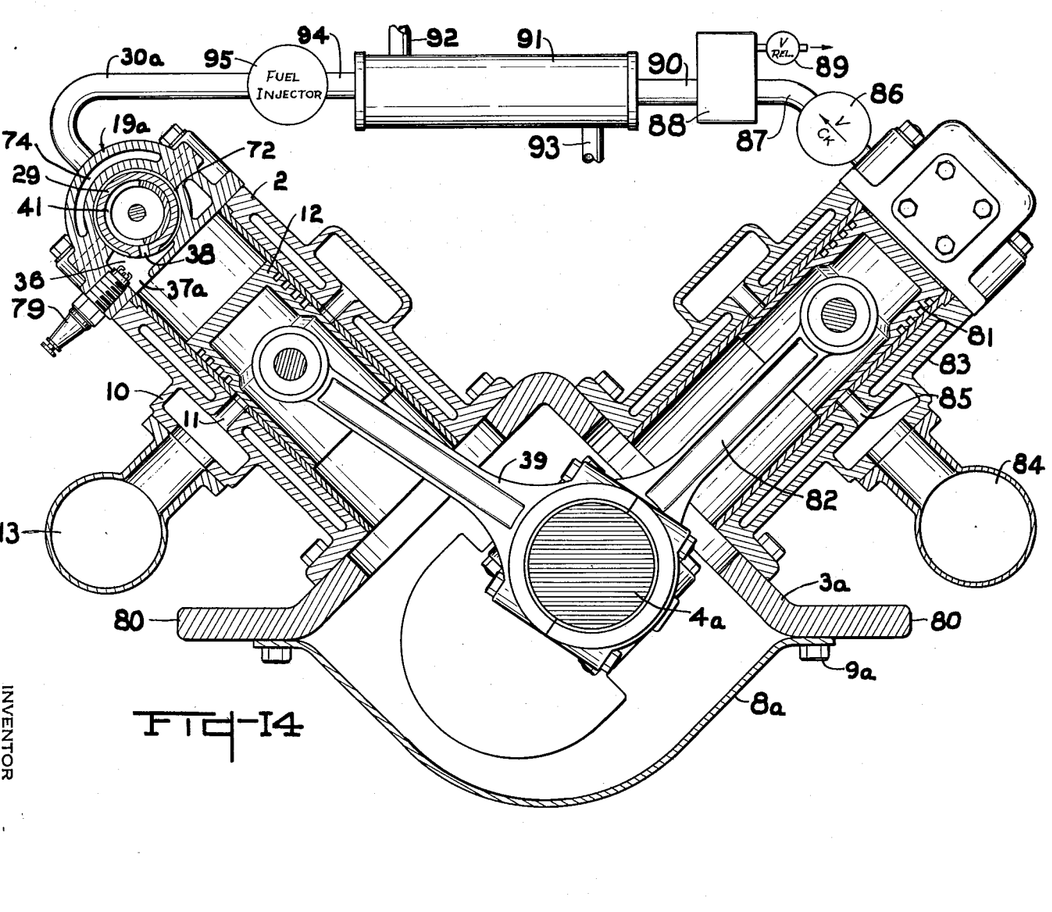
Figure 14 shows a vertical section view, similar to that of Figure 7, illustrating a modified uniflow engine of internal combustion type, and utilizing a rotary sleeve valve mechanism in accordance with the present invention.

Referring more particularly to Figure 1 of the drawings, it will be noted that there is diagrammatically shown a three cylinder engine 1 which, for convenience of describing the present invention, will be referred to as a uniflow steam engine although the invention is not limited to the use of steam since other compressed gaseous fluids may be used in like manner and even compressed combustible mixtures can be used in manner such that internal combustion can be utilized, for instance with a short cut-off and conventional ignition by means of a sparkplug 79 or the like, Figure 14, actuated after the end of the cut-off.

Figure 6:
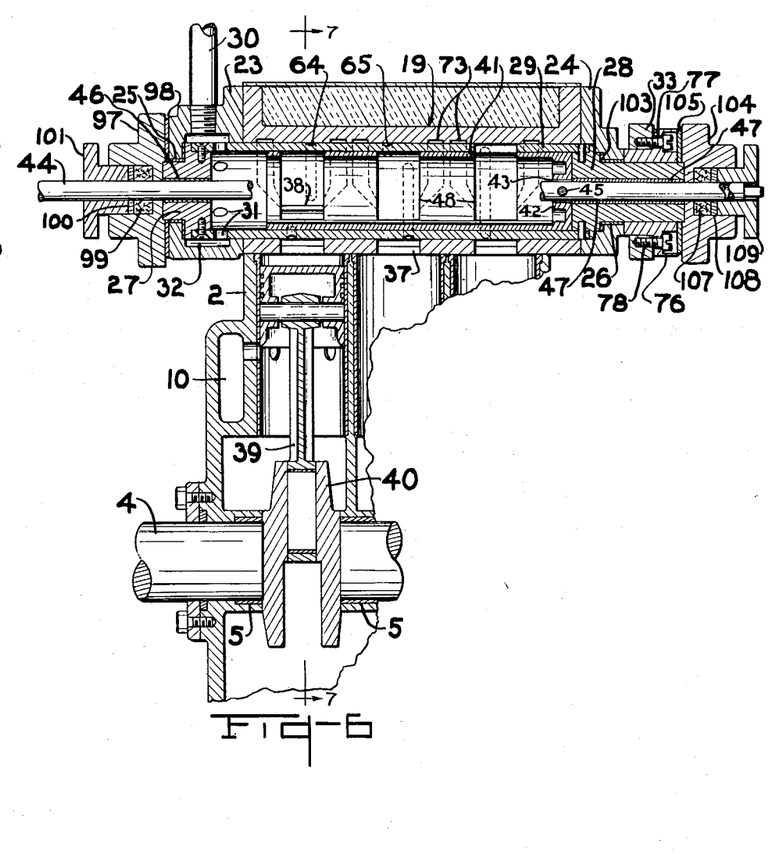
Figure 6 shows a partial vertical section through a three-cylinder uniflow engine, with the rotary sleeve valve mechanism in place, and illustrating the use of labyrinths in the inner surface of the housing.
Figure 7:
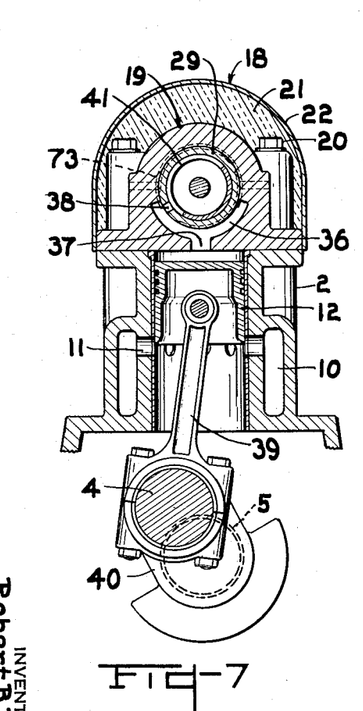
Figure 7 shows a partial vertical section through the engine illustrated in Figure 6, as taken at line 7—7 of same looking in the direction of the arrows.

This engine, as shown in Figure 1, has the usual cylinders 2 extending upward from crank case 3 and on which is mounted crank shaft 4 by means of conventional bearings 5, Figures 6 and 7. This crank shaft in turn carries the usual flywheel 6, Figure 1, and is provided with a suitable flange 7 adapted for connection to any suitable apparatus (not shown) to be driven by the engine. On the bottom of crank case 3 is mounted the conventional crank case pan 8 by means of cap screws 9 or the like.

Each of the cylinders is provided with an exhaust jacket 10, Figures 6 and 7, and each of the cylinders is provided with a series of exhaust openings 11 connected to same at a position just above the top of the engine piston 12 when it is at its lowermost position. The exhaust jacket 10 in turn is conventionally joined to an exhaust pipe 13, Figure 1, which is connected to a steam condenser 14 having an outlet 15 for the condensed steam. This steam condenser can be of various types and perhaps one of the most convenient would be of the surface condensing type wherein a suitable cooling fluid would be delivered to the condenser through inlet pipe 16 and removed therefrom by outlet pipe 17. The condensed steam delivered through pipe 15 would normally be reused in the further production of steam for the engine since such condensate is free from dissolved minerals which would tend to clog the boiler.

While the generation of steam does not form part of the present invention, such generation can be handled in any conventional manner suited to the particular use to be made of the engine. For instance, if this engine were to be used for driving an automotive vehicle, then a flash evaporator type of boiler would be well suited due to its rapid response to variations in steam generation requirements.

Mounted on the top of the cylinders 2 of engine 1 is the rotary sleeve valve mechanism 18 which controls the delivery of steam under pressure to the cylinders for operation of the engine. This valve assembly, as is more particularly shown in Figure 7, is preferably made from strong metal having a relatively low coefficient of expansion to permit close tolerances and yet minimize seizing of the parts under varying conditions of operation. The assembly has a housing 19 fastened in conventional manner to the top of cylinders 2, as by means of cap screws 20. In order to minimize steam condensation, the rotary valve assembly 18 is preferably provided with a jacket of insulation 21 which may be held in place if desired by conventional sheet metal cover 22. In addition the housing 19, Figure 8, may be provided with a conventional steam jacket 74, while cylinders 2 may have a conventional steam jacket 75, with said steam jackets aiding in minimizing steam condensation in the valve mechanism and cylinders.

Figure 4:
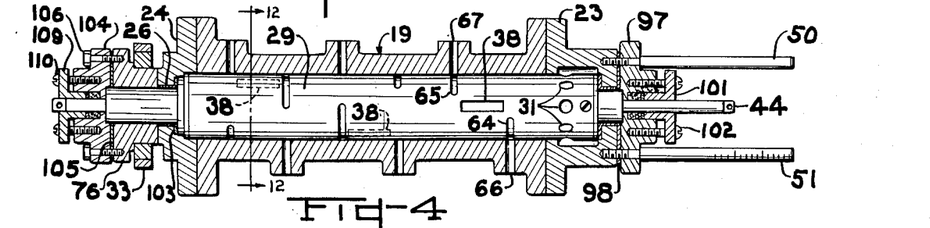
Figure 4 shows a substantially horizontal center section view of the housing of the rotary sleeve valve mechanism with the rotary sleeve in place as viewed along 4—4 of Figure 1, looking in the direction of the arrows.

Mounted on the ends of the housing member 19 are closure cap members 23 and 24, Figures 4 and 6. These closure cap members respectively carry bearings 25 and 26 in which are mounted the corresponding hub members 27 and 28 of the rotary valve sleeve 29. Closure cap member 23 also acts as the steam inlet member through its connection to steam inlet pipe 30, Figures 1, 2, and 6. Rotary sleeve 29 in turn is provided with a series of perforations 31, at steam chest chamber 32 of closure cap member 23, for passage of gaseous fluid under pressure from steam inlet pipe 30 into the interior of rotary sleeve 29. Hub member 28 of rotary sleeve 29 has anchored on its outer end a disc member 76, Figure 6, having slots 77 through which adjustably pass studs 78 by means of which chain sprocket 33 is adjustably anchored to disc member 76 for timing the inlet of gaseous fluid into cylinder 2. Sprocket 33 is connected by means of a chain 34, Figure 1, to a chain sprocket 35 fixedly mounted on crank shaft 4 with said sprockets 33 and 35 being of the same size so that the rotary sleeve 29 will rotate in step with and at the same angular speed as crank shaft 4.

Mounted on the outer end of closure cap member 23, Figure 6, by means of rod members 50 and 51, Figure 4, is a body member 97, Figure 6, and a gasket 98. Body member 97 is bored to form a close fit for cut-off operating shaft 44 and counterbored to receive packing 99, preferably of the graphite type, retained with a brass ring 100 and compressed by a gland 101 which is tightenable to compress said packing through the use of screws 102, Figure 4. At the opposite end of the rotary valve assembly a carbon sealing ring 103 is used inside of closure cap 24 at the end of the rotary sleeve. In addition there is a body member 104 fastened to the end of disc member 76, with a gasket 105 therebetween, and the two anchored together by means of cap screws 106, Figure 4. Body member 104 is bored for a close fit with cut-off operating shaft 44, and counterbored for packing 107, preferably of the graphite type, retained with brass ring 108 and compressed by a gland 109 which is tightenable to compress said packing through the use of screws 110, Figure 4. These conventional packing members at both ends of the valve assembly substantially prevent leakage and thus help to maintain the efficiency of operation of the assembly.

Housing 19 is provided in its under face with a steam collector 36, Figure 7, at the top of each cylinder and that steam collector in turn opens into a main port 37 for delivery of steam or other suitable gaseous fluid into the cylinder above piston 12. Rotary sleeve 29 in turn is provided with a longitudinal valve port 38, Figure 4, which is preferably narrow and long but no longer than the corresponding length of steam collector 36 for a purpose to be hereinafter described. Where there are three cylinders, then there are three of these ports 38 with same located circumferentially around the rotary sleeve 29 at 120° spacings which in turn corresponds with the conventional mountings of the piston connecting rods 39 on the crank arms 40 of the crank shaft 4. These valve ports 38 would, of course, also be spaced lengthwise of rotary sleeve 29 so as to line up with the steam collector 36 over each cylinder.

Mounted inside of rotary sleeve 29 is a cut-off sleeve assembly 41, Figures 6 and 7, which is of a close but free sliding fit therewith. At one end of the cut-off sleeve is an end flange 42 which has a central opening 43 therethrough. A cut-off operating shaft 44 passes through said opening 43 and completely through the rotary sleeve mechanism 18. This shaft 44 is anchored to end flange 42 by means of a pin 45 so that the cut-off sleeve and shaft will move as a unit. Since the rotary sleeve 29, when the engine is operating, moves continuously around shaft 44, hub members 27 and 28 of the rotary sleeve 29 are respectively provided with bearings 46 and 47 for that shaft. The cut-off sleeve is provided with three notches or cut-away portions 48, the longitudinal sides of which are in line and such notches are preferably of a longitudinal length substantially the same as the length of steam collector 36 for each cylinder. The circumferential length of this notch 48 is preferably prechosen to permit the maximum period during which gaseous fluid under pressure can pass from the inside of the rotary valve assembly 18 into the steam collector 36 before the exhaust ports 11 are uncovered. Cut-off sleeve 41 only extends a very short distance beyond the notch 48 which is furthest from end flange 42. This takes care of two things, the first of which is that it does not interfere with the flow of gaseous fluid into the inside of the rotary sleeve valve mechanism 18 through perforations 31, and the second is that it permits the cut-off sleeve 41 to be moved endwise to the left from the position in Figure 6 to decrease the length of the valve port opening through which gaseous fluid can pass. This latter makes possible what is known as throttling, and preferably sufficient endwise movement of the cut-off sleeve is provided so that full throttling can be accomplished if desired.

Figure 2:
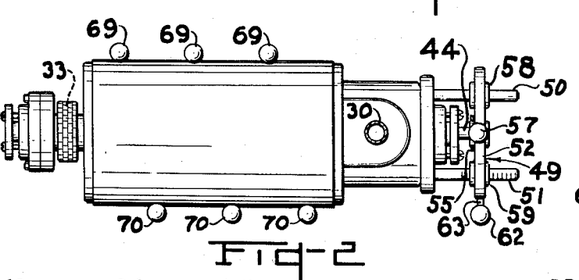
Figure 2 shows a top view of the upper portion of the engine illustrated in Figure 1, as seen at line 2—2 of same looking in the direction of the arrows.
Figure 3:
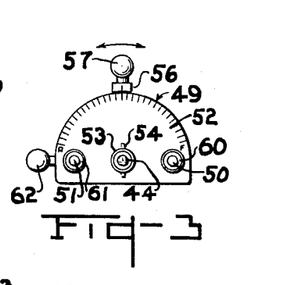
Figure 3 shows an end view of the cut-off control mechanism as viewed along line 3—3 of Figure 1, looking in the direction of the arrows.

In order to operate the cut-off sleeve 41, and thus control the operation of the engine, there is provided at the end of the rotary valve mechanism 18 carrying closure cap member 23, and mounted on the latter, a control mechanism 49, Figures 1, 2, and 3. A simple form of this control mechanism utilizes a pair of parallel rod members 50 and 51 on which is mounted an endwise movable head member 52 through which passes cut-off operating shaft 44. This shaft has on its outer end a ring 53 and pin 54 which holds same against being pulled back through head member 52. On the opposite side of head member 52, and also anchored to shaft 44 by means of a second pin 55, is an operating arm 56 carrying an operating knob 57 adapted for use in the conventional movement of operating arm 56 for the rotation of shaft 44 carrying cut-off sleeve 41 and the holding of such shaft in various positions. Head member 52 is graduated to indicate forward or reverse operation of the engine and also the extent of cut-off for either of these operations. This head member 52 is also preferably provided with bosses 58 and 59 which, if desired, may be fitted with bushings 60 and 61 for ease of endwise sliding on rod members 50 and 51. This sliding action may be controlled by knob member 62 mounted on a threaded shank 63 for frictionally gripping the side of rod member 51 which is preferably graduated to indicate the amount of throttling at different in and out settings of control mechanism 49. This showing is to be considered as diagrammatic of the various constructions adapted for use in operating the cut-off sleeve 41.

Figure 5:
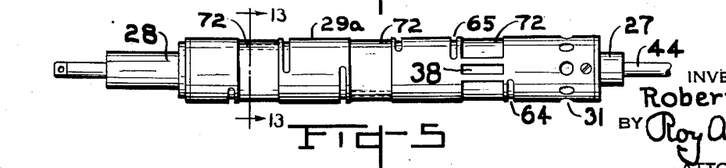
Figure 5 shows a view of a modified form of the rotary sleeve of Figure 4, wherein labyrinths in the outer surface of the sleeve are illustrated.
Figure 8:
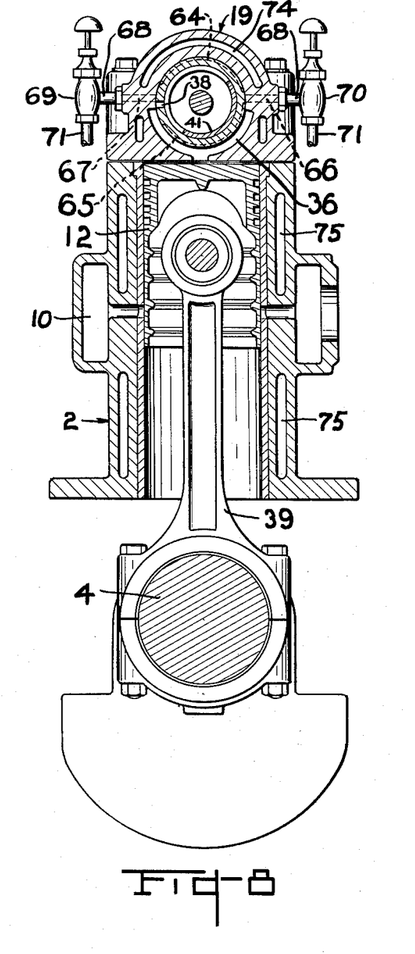
Figure 8 shows a diagrammatic cross-section through a uniflow engine having a rotary sleeve valve mechanism with the port of the rotary sleeve at the point of opening to deliver gaseous fluid under pressure into the upper end of the cylinder.
Figure 9:
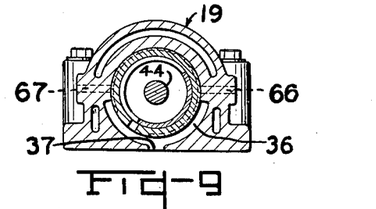
Figure 9 shows a diagrammatic cross-section of a rotary sleeve valve mechanism similar to that of Figure 8 but with the port of the rotary sleeve rotated to the point of starting the cut-off of gaseous fluid flow to the upper end of the cylinder.
Figure 10:
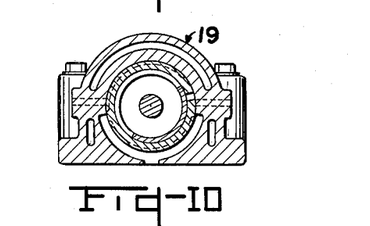
Figure 10 shows a diagrammatic cross-section of a rotary sleeve valve mechanism similar to Figure 8 but with the port of the rotary sleeve moved to the point corresponding to the bottom of the downward stroke of the piston.
Figure 11:
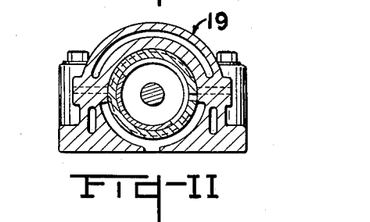
Figure 11 shows a diagrammatic cross-section of a rotary sleeve valve mechanism similar to Figure 8 but with the cut-off sleeve set for reverse rotation of the engine and the port of the rotary sleeve at the point of opening to deliver gaseous fluid under pressure into the upper end of the cylinder.
Figure 12:
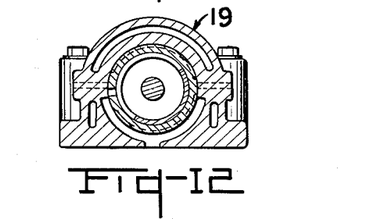
Figure 12 shows a diagrammatic full cross-section view of the rotary sleeve valve mechanism as taken at line 12—12 of Figure 4, looking in the direction of the arrows.

The movement of operating arm 56 thus enables the setting of cut-off sleeve 41 from a position of zero cut-off, through a short cut-off, as is shown in Figures 8, 9, and 10, on around to a point where the gaseous fluid is permitted to enter the cylinder substantially to the end of the piston's downward stroke, all of which may be accomplished step by step by rotating cut-off sleeve 41 counterclockwise until its trailing edge is substantially diametrically opposite from that where the minimum cut-off takes place. On the other hand, by rotating the cut-off sleeve in the opposite direction, as is shown in Figure 11, rotation of the engine will be in reverse direction and again the same series of zero to maximum cut-off positions can be accomplished by then rotating the cut-off sleeve correspondingly in clockwise direction.

Where the engine is to be operated condensing under low vacuum, there will be insufficient residual gaseous fluid left in the cylinder at the end of the exhaust period to cause any particular trouble due to recompression when the piston is returned to its uppermost position ready for the commencing of a new cycle of operation. However, if the engine is to be operated either non-condensing or condensing at or near atmospheric pressure, then there will be sufficient residual gaseous fluid left in the cylinder at the end of the exhaust period to cause recompression difficulties if a minimum clearance of the top of the piston at the end of the up-stroke is to be maintained, and the steam collector 36 is small. In order to meet this situation, regardless of whether the engine is to be operated forward or reverse, relief grooves 64 and 65, Figures 4 and 5, are provided in the outer face of rotary sleeve 29 for each cylinder of the engine. Those grooves are spaced sidewise from the ends of valve ports 38 in order to keep leakage from this port into grooves 64 and 65 at a minimum. Relief groove 64 is arranged to communicate with relief passageway 66, Figure 8, while relief groove 65 connects with relief passageway 67. Joined to the outer ends of these relief passageways are tubes 68, Figure 8, which in turn are connected to relief valves 69 and 70, and they, by means of discharge tubes 71, Figure 1, are connected to the exhaust pipe 13 of the engine.

When the engine is operating in forward direction, then the set of valves 69, which take care of the relief operation under reverse motion, would be closed, and the set of valves 70 handling relief under forward operation would be open. This procedure prevents leakage through the reverse relief grooves under forward operation, and vice versa, a thing which would result in a loss of efficiency for the engine as a whole. It will be noted from Figure 10 that the relief groove 64 will not line up with relief passageway 66 until the piston 12 has started its upward return stroke, and as is shown in Figure 8 the trailing end of relief groove 64 ceases to connect the steam collector 36 to relief passageway 66 only when the piston is almost at the upper end of its return stroke and the inlet port substantially ready to open. In order to utilize this relief feature valves 70 would of course remain open.

If a predetermined relief pressure is desired in order that the pressure in the steam collector be nearer to the inlet pressure of live steam to be admitted through inlet valve port 38 at the start of the down stroke, valves 69 and 70 could be of the weighted relief type which, when in operation, would only open when a predetermined pressure had been reached in the cylinder and collector 36. This extra pressure in the steam collector would tend to reduce wire drawing power losses at the inlet end of the operating cycle while promoting smoother operation. Under reverse motion the same relief procedure takes place except that it is handled through relief valves 69 and grooves 65 with relief valves 69 open and relief valves 70 closed.

Figure 13:
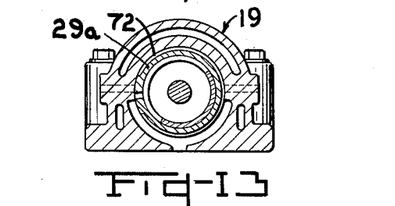
Figure 13 shows a diagrammatic full cross-section view of the rotary sleeve valve mechanism as taken at line 13—13 of Figure 5, looking in the direction of the arrows.

It will be noted that when an assembly, such as shown in Figure 4, is utilized, each time that a valve port 38 opens into a steam collector 36 the gaseous fluid pressure in that steam collector exerts upward pressure against the under face of the rotary sleeve 29 which in turn forces that sleeve up against the upper face of the bore of housing 19. That type of loading occurs each time there is gaseous fluid pressure in any of the steam collectors and, accordingly, there is some frictional loading of the rotary valve sleeve and the problem of lubricating the sleeve to compensate for this frictional loading. For moderate pressures and with adequate lubrication this is not too serious even though not an ideal operating situation. In order to overcome this situation labyrinths may be used either in the rotary sleeve or in the upper portion of the housing. Referring to Figures 5 and 13 it will be noted that rotary sleeve 29a is provided with a labyrinth 72 which starts at opposite sides of each valve port 38 and extends completely around the other side of the rotary valve sleeve as shown. The size of this labyrinth is predetermined so that its upper area will substantially equal the area of the rotary sleeve exposed to the upper face of the steam collector 36. That labyrinth is connected to the steam collector so that in effect there will be a balanced condition with substantially no eccentric loading of the rotary sleeve valve at any time. The placing of the labyrinth 72 in the rotary sleeve is perhaps the most simple way of accomplishing this balancing effect. However, it can be accomplished in another manner wherein the rotary sleeve 29, as shown in Figure 4, with relief grooves 64 and 65 closer together as shown in Figure 6, is utilized without labyrinths in its surface and wherein labyrinths 73 are cut into the inner surface of the housing, with such labyrinths again being made of an area which will substantially equal the area of the rotary sleeve exposed to the upper face of the steam collector in order to attain the desired balancing effect. This construction is well adapted for use with the engine operating condensing under low vacuum the same as the other constructions described, and also non-condensing or condensing at or near atmospheric pressure, due to the recompression relief grooves 64 and 65 with their connections to exhaust pipe 13 as previously described.

With the engine operating condensing under a low vacuum, and utilizing high pressure steam, for instance in the range of 250 to 600 pounds per square inch, one convenient procedure is to move the control mechanism 49 to full throttling position and then set the cut-off sleeve for the desired forward or reverse operation with a long cut-off by appropriately moving operating arm 56. Then by moving control mechanism 49 to the left, as seen in Figure 1, cut-off sleeve 41 will open one or more of the valve ports 38 into a corresponding steam collector 36, through which the high pressure steam will flow, by way of main ports 37, to exert pressure on the top of the piston 12 to operate the engine. As the engine comes up to speed the cut-off can be shortened to increase the steam expansion and efficiency of the engine, and throttling can be resorted to if desired for attaining better control of the engine's performance.

While the present invention is particularly adapted for use with steam, it is also adapted for internal combustion use, and one apparatus of that type is diagrammatically shown in Figure 14. Referring to that figure, it will be noted that the cylinders 2 have mounted thereon a rotary valve housing 19a in the manner previously described. That housing however is modified to offset the main port 37a which connects collector space 36 in housing 19a to the upper end of cylinder 2. Directly above main port 37a for each cylinder, and passing through the side of housing 19a, is a spark plug 79 which, under operating conditions, would be connected to a conventional distributor (not shown) in accordance with standard well known practice which forms no part of the present invention. Cylinders 2 are mounted on a special shaped crank case 3a carrying conventional bearings (not shown) for crank shaft 4a. This crank case 3a is provided with integral ears 80 for mounting on a motor vehicle frame (not shown) or other suitable support. A crank case pan 8a is mounted in conventional manner on the bottom of crank case 3a by means of cap screws 9a or the like.

In order to deliver a combustible mixture through the rotary sleeve valve assembly and through the main port into the upper end of the cylinder ready for ignition at the proper time and to have same under adequate pressure to give a powerful thrust upon ignition, it is necessary to deliver the combustible mixture to the cylinder under suitable pressure in excess of atmospheric. To take care of this, the whole assembly can conveniently be made of V-type with the cylinders 2 forming one side of the V and a compressor forming the other side. The compressor in that case can be provided with a piston 81 connected by means of connecting rod 82 to crank shaft 4a. Preferably there will be as many compressor cylinders 83 as there are cylinders 2, and for convenience cylinder 83 has been shown of the same type as cylinder 2. The inlet 84 connects to the side of compressor cylinder 83 and at the end of the down stroke of piston 81 there will be a vacuum created above that piston and into which air will rush through inlet 84 when the piston uncovers inlet perforations 85. When the piston moves upward, it forces the compressed air past a check valve 86 through pipe 87 into a storage tank 88 having a relief valve 89. Pipe 90 connects storage tank 88 to an air cooler 91 which has an inlet 92 and an outlet 93 for a cooling fluid. This air cooler would preferably be of the two fluid type wherein the fluids are kept separate. Pipe 94 connects air cooler 91 to a fuel injector 95 from which pipe 30a extends to closure cap member 23, Figure 4, for delivery of the compressed combustible mixture to the interior of the rotary valve mechanism for distribution as previously described.

In operation the cut-off sleeve 41 would be moved to full throttling position at the start of the cycle and would then be rotated to the cut-off position meeting a desired operating condition. This will admit some of the combustible mixture under pressure into the upper portion of one of the cylinders through valve port 38. If the pressure of that fluid is sufficient, it will cause the piston to move downward until valve 38 is covered by the cut-off sleeve 41. The ignition system would be tied in conventional manner to this valve port and cut-off sleeve so that at no time would ignition take place except when the sleeve 41 has closed valve port 38. It might accordingly be necessary after admitting the combustible mixture to move the cut-off sleeve in clockwise direction, as seen in Figure 14, to close the electrical circuit and permit ignition to take place and start the motor. By having the storage tank with air under pressure, the engine can thus be self starting while otherwise it would need a starter much like present day automobile engines.

Other modes of applying the principle of my invention may be employed instead of those explained, change being made as regards the apparatus herein disclosed, provided the means stated by any of the following claims or the equivalent of such stated means be employed.

I therefore particularly point out and distinctly claim as my invention:

1. A gaseous fluid operated prime mover having at least one piston and cylinder and utilizing a rotary inlet valve assembly, which comprises a rotary sleeve for said inlet valve assembly, a housing in which said sleeve rotatably and closely but freely fits, an inlet connection to said housing for the operating gaseous fluid, means for delivering said operating gaseous fluid into the interior of said rotary sleeve, said housing having a gaseous fluid collector and main inlet port for each cylinder containing a piston to be driven by said operating gaseous fluid, said gaseous fluid collector determining the starting point of inlet of gaseous fluid to said main inlet port for each cylinder, said rotary sleeve having a longitudinally long but relatively narrow inlet valve port to facilitate close control of gaseous fluid supplied to each cylinder, means for driving said rotary sleeve so that the inlet valve port for each cylinder is ready to start opening to deliver said gaseous fluid to same through said gaseous fluid collector when said piston is at the end of said cylinder adjacent said inlet valve assembly, means for determining over a continuous range the amount of rotative travel of said rotary sleeve during which said gaseous fluid is delivered to said cylinder, and means for relieving recompression pressure in said cylinder, wherein said means for relieving recompression pressure in said cylinder utilizes a relief groove in the outer periphery of said rotary sleeve, and a recompression relief outlet from said housing, said relief groove being in communication with said gaseous fluid collector and said recompression relief outlet throughout a major portion of the time during which said piston is returning to the rotary sleeve valve end of said cylinder.

2. A gaseous fluid operated prime mover having at least one piston and cylinder and utilizing a rotary inlet valve assembly, which comprises a rotary sleeve for said inlet valve assembly, a housing in which said sleeve rotatably and closely but freely fits, an inlet connection to said housing for the operating gaseous fluid, means for delivering said operating gaseous fluid into the interior of said rotary sleeve, said housing having a gaseous fluid collector and main inlet port for each cylinder containing a piston to be driven by said operating gaseous fluid, said gaseous fluid collector determining the starting point of inlet of gaseous fluid to said main inlet port for each cylinder, said rotary sleeve having a longitudinally long but relatively narrow inlet valve port to facilitate close control of gaseous fluid supplied to each cylinder, means for driving said rotary sleeve so that the inlet valve port for each cylinder is ready to start opening to deliver said gaseous fluid to same through said gaseous fluid collector when said piston is at the end of said cylinder adjacent said inlet valve assembly, means for determining over a continuous range the amount of rotative travel of said rotary sleeve during which said gaseous fluid is delivered to said cylinder, and means for relieving recompression pressure in said cylinder, wherein there are labyrinths in the space between said housing and said rotary sleeve and connected to said gaseous fluid collector for reducing the eccentric loading on said rotary sleeve due to the pressure of said operating gaseous fluid in said gaseous fluid collector against the outer face of said rotary sleeve.

3. A rotary sleeve valve assembly, which comprises a housing having a longitudinal cylindrical bore, at least one recess opening into said bore from one side thereof, a rotary sleeve closely but freely fitting said bore and having a longitudinally long but relatively narrow port adapted to align with said recess during part of the rotation of said sleeve, closure members at each end of said housing, a cut-off sleeve slidably and closely but freely fitting in said rotary sleeve with the latter adapted to freely rotate around said cut-off sleeve with the latter also being movable endwise, said cut-off sleeve having a circumferentially long port adapted to align with said recess in said housing and to close said relatively narrow port in said rotary sleeve at a prechosen point during the rotation of the latter, said rotary sleeve and housing with end closure members having a continuously open passageway into said rotary sleeve, means extending through one of said closure members for use in rotating said rotary sleeve, and means for operating said cut-off sleeve to independently control its rotary and endwise movements.

4. A rotary sleeve valve assembly as set forth in claim 3, wherein there are labyrinths in the space between said housing and said rotary sleeve and connected to said gaseous fluid collector for reducing eccentric loading on said rotary sleeve due to the pressure of said operating gaseous fluid in said gaseous fluid collector against the outer face of said rotary sleeve.

5. A rotary sleeve valve assembly as set forth in claim 3, wherein the means for operating the cut-off sleeve includes a shaft which is coaxial with said cut-off sleeve and anchored in fixed position to same, said shaft extending through one of said end closure members, and means joined to the extending end of said shaft for rotating said shaft and sleeve to vary the position of the port in said cut-off sleeve relative to the recess in said housing.

6. A rotary sleeve valve assembly as set forth in claim 3, wherein the means for operating the cut-off sleeve includes a shaft which is coaxial with said cut-off sleeve and anchored in fixed position to same, said shaft extending through at least one of said end closure members, and means joined to the extending end of said shaft for rotatably shifting said shaft and sleeve to control cut-off by varying the position of the port in said cut-off sleeve relative to the recess in said housing, and also for moving said cut-off sleeve endwise for independent throttling action on the port of said rotary sleeve.

7. In a rotary sleeve valve assembly for a reciprocating piston uniflow engine, said valve assembly having a gaseous fluid inlet and a gaseous fluid collector at the outlet therefrom, the combination of a recompression relief means, said rotary sleeve having at least one groove in its outer periphery adapted to only communicate with said recompression relief means and said gaseous fluid collector throughout a major portion of the time during which said piston is moving toward said valve assembly.

8. In a rotary sleeve valve assembly for a reciprocating piston uniflow engine, said valve assembly having a gaseous fluid inlet and a gaseous fluid collector at the outlet therefrom, the combination of a recompression relief means including a valve with inlet passageway, said rotary sleeve having at least one groove in its outer periphery adapted to only communicate with said gaseous fluid collector and with said passageway connected to the inlet of said recompression relief valve throughout a major portion of the time during which said piston is moving toward said valve assembly.

9. A gaseous fluid operated prime mover having at least one piston and cylinder and utilizing a rotary inlet valve assembly, which comprises a rotary sleeve for said inlet valve assembly, a housing in which said sleeve rotatably and closely but freely fits, an inlet connection to said housing for the operating gaseous fluid, means for deliverying said operating gaseous fluid into the interior of said rotary sleeve, said housing having both a gaseous fluid collector exposed full length to the side of said rotary sleeve, to facilitate variable cut-off, and a main inlet port, as a separate pair, for each cylinder containing a piston to be driven by said operating gaseous fluid, said gaseous fluid collector determining the starting point of inlet of gaseous fluid to said main inlet port for each cylinder, said rotary sleeve having a longitudinally long but relatively narrow inlet valve port to facilitate close control of the gaseous fluid supplied to each cylinder, means for driving said rotary sleeve so that the inlet valve port for each cylinder is ready to start opening to deliver said gaseous fluid to same through said gaseous fluid collector when said piston is at the end of said cylinder adjacent said inlet valve assembly, and rotatably adjustable means for determining over a continuous range the amount of rotative travel of said rotary sleeve, in either direction, during which said gaseous fluid is delivered to said cylinder.

10. A gaseous fluid operated prime mover as set forth in claim 9, wherein each valve port in the rotary sleeve is an inlet port in the form of a longitudinal slit, and the matching edges of the valve assembly which govern the opening and closing, respectively, of this port being substantially in line with the leading and trailing edges of the valve port to facilitate sudden opening and closing of the latter, and wherein there is connected to each gaseous fluid collector a labyrinth means between said housing and said rotary sleeve to at least partially overcome eccentric loading of said rotary sleeve during delivery of gaseous fluid through said inlet port into said gaseous fluid collector.

11. A gaseous fluid operated prime mover as set forth in claim 9, wherein each valve port of said rotary sleeve is an inlet port in the form of a longitudinal slit with the matching edges of the valve assembly which govern the opening and closing, respectively, of this port being substantially in line with the leading and trailing edges of this rotary sleeve valve port to facilitate sudden opening and closing of the latter, and wherein said rotary sleeve is provided on its outer surface with an individual labyrinth for each gaseous fluid collector to at least partially overcome eccentric loading of said rotary sleeve during the delivery of gaseous fluid through an inlet port into said gaseous fluid collector, and further wherein said piston is conventionally connected to a crank shaft, and said means for driving said rotary sleeve is connected to said crank shaft so that said sleeve and crank shaft will rotate in unison at the same angular speed.

12. A gaseous fluid operated prime mover as set forth in claim 9, wherein said means for determining the amount of rotative travel of the rotary sleeve during which the gaseous fluid is delivered to the cylinder is in the form of an endwise slidable rotary cut-off sleeve closely but freely fitting said rotary sleeve.

13. A gaseous fluid operated prime mover having at least one piston and cylinder and utilizing a rotary inlet valve assembly, which comprises a rotary sleeve for said inlet valve assembly, a housing in which said sleeve rotatably and closely but freely fits, an inlet connection to said housing for the operating gaseous fluid, means for delivering said operating gaseous fluid into the interior of said rotary sleeve, said housing having both a gaseous fluid collector exposed full length to the side of said rotary sleeve, to facilitate variable cut-off, and a main inlet port, as a separate pair, for each cylinder containing a piston to be driven by said operating gaseous fluid, said gaseous fluid collector determining the starting point of inlet of gaseous fluid to said main inlet port for each cylinder, said rotary sleeve having a longitudinally long but relatively narrow inlet valve port to facilitate close control of gaseous fluid supplied to each cylinder, means for driving said rotary sleeve so that the inlet valve port for each cylinder is ready to start opening to deliver said gaseous fluid to same through said gaseous fluid collector when said piston is at the end of said cylinder adjacent said inlet valve assembly, means for determining over a continuous range the amount of rotative travel of said rotary sleeve during which said gaseous fluid is delivered to said cylinder, said last named means being rotatably adjustable for controlling movement in either direction of said means for driving said rotary sleeve, and means for relieving recompression pressure in said cylinder, said recompression relieving means having one relief means operable when said rotary sleeve moves in one direction, and another when said rotary sleeve moves in the opposite direction.

14. A gaseous fluid operated prime mover as set forth in claim 13, wherein each valve port in the rotary sleeve is an inlet port in the form of a longitudinal slit, and the matching edges of the valve assembly which govern the opening and closing, respectively, of each port being substantially in line with the leading and trailing edges of the corresponding valve port to facilitate sudden opening and closing of the latter, and wherein there is connected to each gaseous fluid collector a labyrinth means between said housing and said rotary sleeve to at least partially overcome eccentric loading of said rotary sleeve during delivery of gaseous fluid through said inlet port into said gaseous fluid collector.

15. A gaseous fluid operated prime mover as set forth in claim 13, wherein each valve port of said rotary sleeve is an inlet port in the form of a longitudinal slit with the matching edges of the valve assembly which govern the opening and closing, respectively, of each port being substantially in line with the leading and trailing edges of the corresponding valve port to facilitate sudden opening and closing of the latter, and wherein said rotary sleeve is provided on its outer surface with an individual labyrinth for each gaseous fluid collector to at least partially overcome eccentric loading of said rotary sleeve during the delivery of gaseous fluid through an inlet port into said gaseous fluid collector, and further wherein said piston is conventionally connected to a crank shaft, and said means for driving said rotary sleeve is connected to said crank shaft so that said sleeve and crank shaft will rotate in unison at the same angular speed.

16. A gaseous fluid operated prime mover as set forth in claim 13, wherein said means for determining the amount of rotative travel of the rotary sleeve during which the gaseous fluid is delivered to the cylinder is in the form of an endwise slidable rotary cut-off sleeve closely but freely fitting said rotary sleeve.

17. In an internal combustion prime mover having a cylinder with piston conventionally connected to a crank shaft which is also conventionally connected to the piston of an air compressor for delivering air through a suitable pressure tank and fuel injector to the inlet of said prime mover, the combination therewith of a housing conventionally mounted on the head end of said cylinder and having said inlet for said combustible mixture, a rotary sleeve rotatably and closely but freely fitting said housing, means for delivering said combustible mixture from said inlet into the interior of said rotary sleeve, drive means connecting said rotary sleeve to said crank shaft so that said sleeve and crank shaft will rotate simultaneously at an operable ratio of angular speed, said housing having both a combustible fluid collector exposed full length of the side of said rotary sleeve, to facilitate variable cut-off, and a main inlet port, as a separate pair for each cylinder containing a piston to be driven by said combustible gaseous fluid, said combustible gaseous fluid collector determining the normal starting point of inlet of said fluid to the inlet port of each cylinder, said rotary sleeve having a longitudinally long but relatively narrow inlet port to facilitate close control of said combustible gaseous fluid supplied to each cylinder, said means for driving said rotary sleeve being timed so that the inlet valve port for each cylinder is ready to start opening to deliver said combustible gaseous fluid to same through said gaseous fluid collector when said piston is in position to start its power delivering stroke from the end of said cylinder adjacent said inlet, an endwise slidable rotary cut-off sleeve closely but freely fitting the inside of said rotary sleeve, means connected to said cut-off sleeve to determine the amount of rotative travel of said rotary sleeve during which said combustible gaseous fluid is delivered to the cylinder, said housing and said rotary sleeve having between them a labyrinth means opening into the corresponding cylinder's gaseous fluid collector so as to at least partially overcome eccentric loading of said rotary sleeve during delivery of said compressed combustible gaseous fluid through said inlet port into said combustible gaseous fluid collector as well as during the combustion of same, and means for igniting said combustible mixture in a cylinder of said prime mover only after it has passed through said rotary and cut-off valves and when the inlet into said cylinder through same has been closed.

References Cited in the file of this patent

UNITED STATES PATENTS

| | | |
|---|---|---|
| 298,063 | Bogert | May 6, 1884 |
| 727,752 | Crompton | May 12, 1903 |
| 748,045 | Britton | Dec. 29, 1903 |
| 939,376 | Appleton | Nov. 9, 1909 |
| 1,072,308 | Burton | Sept. 2, 1913 |
| 1,530,881 | Burks | Mar. 24, 1925 |
| 1,559,417 | Gentzel | Oct. 27, 1925 |
| 1,578,581 | Casna | Mar. 30, 1926 |
| 1,579,296 | Francois | Apr. 6, 1926 |
| 1,633,851 | Durr | June 28, 1927 |